US007943255B2

(12) United States Patent
Ito et al.

(10) Patent No.: US 7,943,255 B2
(45) Date of Patent: May 17, 2011

(54) HYDROGEN-ABSORPTION ALLOY ELECTRODE

(75) Inventors: Kojiro Ito, Kosai (JP); Shinichiro Ito, Kosai (JP); Hajime Seri, Izumiotsu (JP); Shinichi Yuasa, Kyotanabe (JP); Munehisa Ikoma, Nara (JP)

(73) Assignee: Panasonic Corporation, Osaka (JP)

( * ) Notice: Subject to any disclaimer, the term of this patent is extended or adjusted under 35 U.S.C. 154(b) by 1104 days.

(21) Appl. No.: 11/546,336

(22) Filed: Oct. 12, 2006

(65) Prior Publication Data

US 2007/0099082 A1  May 3, 2007

Related U.S. Application Data

(63) Continuation of application No. 10/175,420, filed on Jun. 20, 2002, now abandoned.

(30) Foreign Application Priority Data

Jun. 21, 2001 (JP) ................................ 2001-188671

(51) Int. Cl.
   *H01M 4/38* (2006.01)
   *H01M 4/58* (2006.01)
   *H01M 4/26* (2006.01)
   *B22F 1/00* (2006.01)

(52) U.S. Cl. .................. 429/218.2; 420/900; 252/182.1; 75/351; 29/623.1

(58) Field of Classification Search ............... 429/218.2, 429/101; 252/182.1; 420/900; 75/351; 29/623.1
See application file for complete search history.

(56) References Cited

U.S. PATENT DOCUMENTS

| | | | |
|---|---|---|---|
| 5,277,999 A | 1/1994 | Ovshinsky et al. | |
| 5,389,333 A | 2/1995 | Li et al. | |
| 5,407,761 A | 4/1995 | Ovshinsky et al. | |
| 5,536,591 A | 7/1996 | Fetcenko et al. | |
| 5,554,456 A | 9/1996 | Ovshinsky et al. | |
| 5,616,432 A | 4/1997 | Ovshinsky et al. | |
| 5,753,386 A * | 5/1998 | Inaba et al. ................... | 429/101 |
| 6,322,926 B1 | 11/2001 | Kasashima et al. | |
| 6,399,247 B1 | 6/2002 | Kitayama et al. | |
| 2003/0005982 A1 | 1/2003 | Ito et al. | |

FOREIGN PATENT DOCUMENTS

| | | |
|---|---|---|
| EP | 975035 A1 * | 1/2000 |
| EP | 1032067 | 8/2000 |
| JP | 61-285658 | 12/1986 |
| JP | 63175339 A * | 7/1988 |

(Continued)

OTHER PUBLICATIONS

"Effect of alkali-treatment of hydrogen storage alloy on the degradation of Ni/MH batteries", Ikoma et al., Journal of Alloys and Compounds 284 (1999) 92-98.*

(Continued)

*Primary Examiner* — Jonathan Crepeau
*Assistant Examiner* — Kenneth Douyette
(74) *Attorney, Agent, or Firm* — Greenblum & Bernstein, P.L.C.

(57) ABSTRACT

A method of manufacturing a hydrogen-absorption alloy electrode which comprises particles of a hydrogen-absorption alloy that comprises a rare earth element, Ni, Co and Al. The method comprises subjecting the hydrogen-absorption alloy particles to an alkaline treatment in a 10 to 50 weight % NaOH solution at 60 to 140° C. for 0.5 to 5 hours such that on the surface of the particles (amount of Al on surface/amount of Al in alloy)<(amount of Co on surface/amount of Co in alloy).

6 Claims, 2 Drawing Sheets

FOREIGN PATENT DOCUMENTS

| | | |
|---|---|---|
| JP | 4-292860 | 10/1992 |
| JP | 7-073880 | 3/1995 |
| JP | 9-245782 | 9/1997 |
| JP | 10-074508 | 3/1998 |
| JP | 10-228902 | 8/1998 |
| JP | 2001-135311 | 5/2001 |
| WO | 94/05050 | 3/1994 |
| WO | 96/33518 | 10/1996 |

OTHER PUBLICATIONS

English Translation of JP 63175339 A, Kawano et al., Jul. 1988.*
English Abstract of JP 63175339 A, Kawano et al., Jul. 1988.*
English Language Abstract of JP 10-228902.
English Language Abstract of JP 4-292860.
English Language Abstract of JP 10-074508.
English Language Abstract of JP 7-073880.
English Language Abstract of JP 61-285658.
English Language Abstract of JP 9-245782.
Material Safety Data Sheet for Sodium Hydroxide (more than 10%) Solutions and Concentrates. [Online] Mallinckrodt Baker, Inc. [retrieved on Jul. 10, 2006]; <URL: http://www.jtbaker.com/msds/englishhtml/S4037.htm>.
Material Safety Data Sheet for Potassium Hydroxide (10-45%) Solutions and Concentrates. [Online] Mallinckrodt Baker, Inc. [retrieved on Jul. 10, 2005]. Retrieved from the Internet: <URL: http://www.jtbaker.com/msds/Englishhtml.p5887.htm>.
IDPL JPO Machine Translation for JP 2001-135311A (publication date of May 2001).

* cited by examiner

HYDROGEN-ABSORPTION ALLOY ELECTRODE

CROSS-REFERENCE TO RELATED APPLICATIONS

The present application is a continuation of U.S. application Ser. No. 10/175,420, filed Jun. 20, 2002 now abandoned, the entire disclosure whereof is expressly incorporated by reference herein, which claims priority under 35 U.S.C. §119 of Japanese Patent Application No. 2001-188671, filed Jun. 21, 2001, the entire disclosure whereof is expressly incorporated by reference herein.

BACKGROUND OF THE INVENTION

1. Field of the Invention

The present invention relates to a hydrogen-absorption alloy electrode for use as a negative electrode in nickel-metal hydride rechargeable batteries.

2. Description of Related Art

Hydrogen-absorption alloys are capable of absorbing and releasing hydrogen at around room temperature and under around atmospheric pressure and are therefore used as a material for negative electrodes in nickel-metal hydride rechargeable batteries. Nickel-metal hydride rechargeable batteries are high in energy density as compared to nickel-cadmium rechargeable batteries and lead storage batteries and with their electrodes essentially free of harmful elements, have attracted much attention as clean batteries.

Hydrogen-absorption alloy electrodes make use of particles of a hydrogen-absorption alloy. Such particles are prepared by first roughly grinding an alloy ingot and then mechanically milling the ground alloy with an attritor into particles having a predetermined average size of, for example, about 50 μm.

One disadvantage of hydrogen-absorption alloys is that when exposed to air, the alloys readily form a layer of oxides, which prevents absorption and release of hydrogen by the alloy. To cope with this, several techniques have been developed through which a nickel metal layer is formed on the surface of the alloy particles to act as a hydrogen dissociation catalyst layer for enhancing the activity of the alloy. Among these techniques are (1) treatment of the hydrogen-absorption alloy in a high-temperature alkaline solution, (2) treatment in an acidic aqueous solution such as hydrochloric acid, and (3) electroless plating of Ni onto the alloy particles.

The mechanically milled hydrogen-absorption alloy particles, however, widely range in size from several microns to several tens of microns, and the size distribution of the particles tends to deviate significantly. This results in a significant deviation in self-discharging characteristics after charging/discharging cycles.

Also, when the particles of hydrogen-absorption alloy whose surfaces have been covered with a nickel metal layer are used in an electrode of batteries, the activity of the alloy and thus the initial battery characteristics remain low during initial cycles. To address this problem, the batteries are subjected to an initial activation process by repeating charging and discharging several times at a small current so that a predetermined capacity is ensured. However, this process requires a considerable amount of time and thus reduces productivity.

SUMMARY OF THE INVENTION

In light of the above-mentioned problems, an object of the present invention is to provide a hydrogen-absorption alloy electrode that causes little deviation in battery characteristics after charging/discharging cycles and shows a high activity even during initial charging/discharging cycles.

Thus, one aspect of the present invention provides a hydrogen-absorption alloy electrode in which particles of hydrogen-absorption alloy have a size distribution such that $d90/d10 \leq 8$ and $d90-d10 \leq 50$ μm, where di (where i varies from 0 to 100) means a particle size at which cumulative size frequency with respect to the entire particles is i %. By limiting the size distribution of the hydrogen-absorption alloy particles in this manner, the deviation in the battery characteristics resulting after charging/discharging cycles is minimized. For conventional hydrogen-absorption alloy particles, the value of d90/d10 is approximately 10 or larger and the value of d90-d10 is from about 80 to about 100 μm. The limiting of the size distribution is carried out by sorting particles after milling by mechanical means such as an attritor.

The average size of the particles of the hydrogen-absorption alloy is reduced to a size smaller than that of conventional hydrogen-absorption alloy particles whose d90 is from 80 to 100 μm and d50 is approximately 50 μm, by adjusting the size distribution such that $d90 \leq 60$ μm and/or $d50 \leq 25$ μm. In this manner, the surface area of the particles is correspondingly increased and as a result, the power of the battery is increased. Although the small particle size can reduce the cycle life of the battery, a required cycle life is ensured by controlling the charging/discharging process so that charging/discharging takes place in a limited area.

Another aspect of the invention provides a hydrogen-absorption alloy electrode containing, as a principal material, particles of a hydrogen-absorption alloy containing a rare earth element, Ni, Co and Al. This electrode is constructed in such a manner that on the surface of the alloy, the following relationship holds: (the amount of Al on the surface/the amount of Al in the alloy)<(the amount of Co on the surface/the amount of Co in the alloy).

In a conventional alkaline treatment for forming a nickel metal layer on the surface of alloy particles to serve as a hydrogen dissociation catalyst layer to enhance the activity of the alloy, the Ni layer is formed on the surface of the alloy particles, for example, by treating the particles with KOH solution at 100° C. for 1 hour. If the alloy contains metals such as Ni, Al, Co and Mn, the metals other than Ni, that is, Al, Co and Mn dissolve from the surface of the alloy. In the course of various experiments, the present inventors have made a finding that it is possible to allow Co to remain on the surface of the alloy particles by subjecting the particles to an alkaline treatment under proper conditions, for example, in NaOH solution under a boiling condition of 125° C. for 0.5 hours or longer, and in this manner the Co remaining on the surface of the alloy effectively acts as the hydrogen dissociation catalyst layer and thus enhances the activity of the alloy. Thus, by constructing the hydrogen-absorption alloy electrode in the above-described manner so that that the following relationship holds: (the amount of Al on the surface/the amount of Al in the alloy)<(the amount of Co on the surface/the amount of Co in the alloy), the activity of the alloy and thus the activity of the electrode is increased during initial charging/discharging cycles. As a result, the initial activation process can be completed in a relatively short period of time or, in some cases, can be eliminated. For example, if the treatment is performed under the above-described conditions, then the ratio of (the amount of Al on the surface/the amount of Al in the alloy):(the amount of Co on the surface/the amount of Co in the alloy) will be 0.02 to 0.2:1. This means that a larger proportion of Co remains on the surface of the alloy and therefore, a high initial activity is achieved.

Still another aspect of the invention provides a hydrogen-absorption alloy electrode containing, as a principal material, particles of a hydrogen-absorption alloy containing a rare earth element, Ni, Co and Mn. This electrode is constructed such that on the surface of the alloy, the following relationship holds: (the amount of Mn on the surface/the amount of Mn in the alloy)<(the amount of Co on the surface/the amount of Co in the alloy). This construction provides similar effects to those described above.

Still another aspect of the invention provides a hydrogen-absorption alloy electrode containing, as a principal material, particles of a hydrogen-absorption alloy containing a rare earth element, Ni, Co, Al and Mn. This electrode is constructed such that on the surface of the alloy, the following relationship holds: (the amount of Al+Mn on the surface/the amount of Al+Mn in the alloy)<(the amount of Co on the surface/the amount of Co in the alloy). This construction provides similar effects to those described above.

As used herein, the term "the surface of alloy" refers to a surface layer formed on the surface of the alloy particles when the particles are made to corrode through the above-described alkaline treatment so that some of the alloy material is dissolved. If the treatment is performed under the above-described conditions, the alloy particles corrode to a depth of about 0.40 μm, which is significantly thicker than 0.13 μm observed in the conventional treatment.

By combining the characteristics of the alloy surface with the characteristics provided by the size distribution of the alloy particles, multiplier effects of the two features are obtained.

While novel features of the invention are set forth in the preceding, the invention, both as to organization and content, can be further understood and appreciated, along with other objects and features thereof, from the following detailed description and examples when taken in conjunction with the attached drawings.

DETAILED DESCRIPTION OF THE PREFERRED EMBODIMENTS

Figure 1:
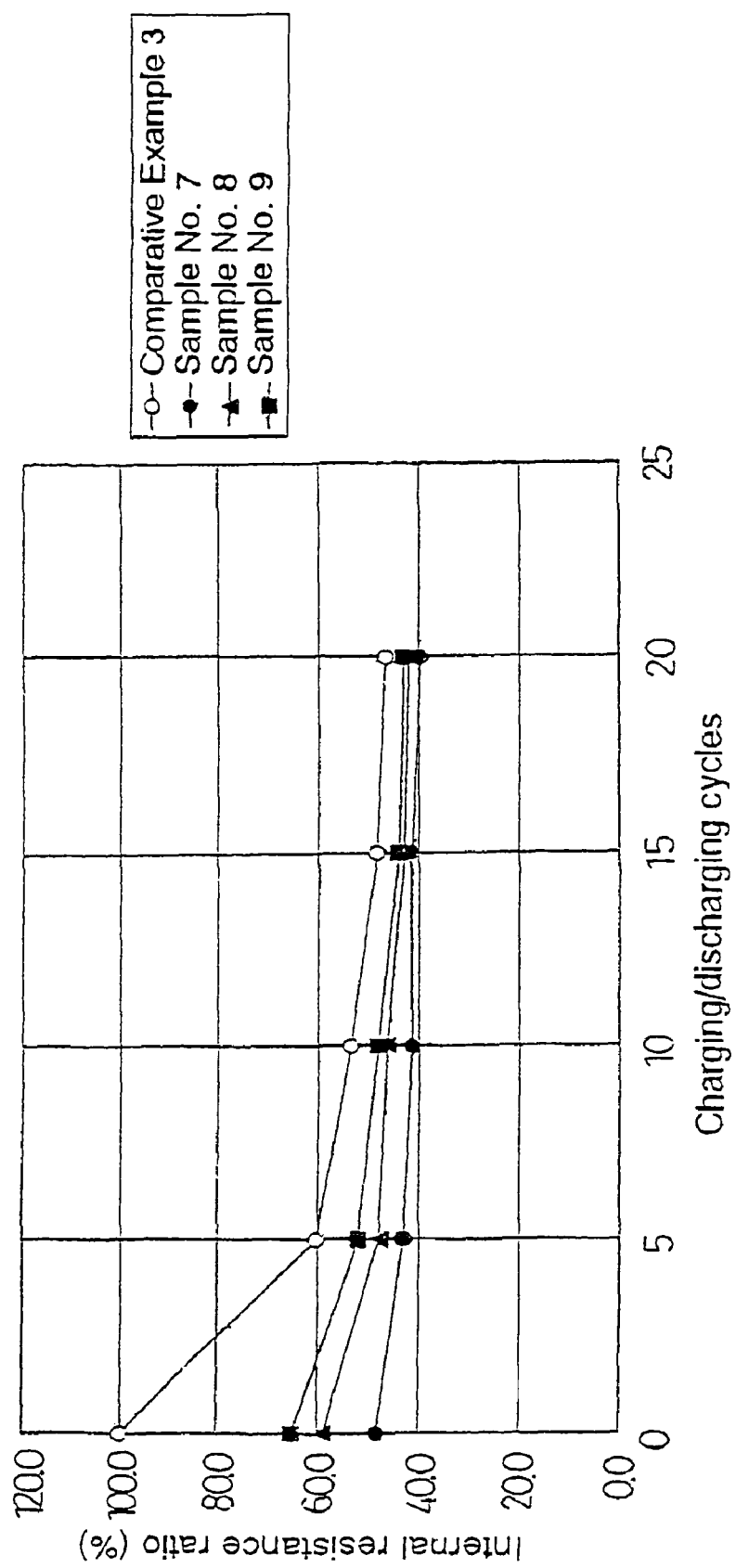
FIG. 1 is a graph showing the change in internal resistance ratio resulting from charging/discharging cycles for each of Examples of a hydrogen-absorption alloy electrode of the present invention and Comparative Examples.

One embodiment of a hydrogen-absorption alloy electrode of the present invention will now be described with reference to FIG. 1.

A hydrogen-absorption alloy for use in the hydrogen-absorption alloy electrode of the present invention is preferably a metal compound that has a composition given by a stoichiometric ratio of $LaNi_5$ in which some of La has been replaced by Ce, Pr, Nd, or other rare earth elements and some of Ni has been replaced by metals such as Co, Mn and Al, although the composition may considerably vary.

The hydrogen-absorption alloy is preferably made in the form of a block by casting molten metals in a mold because of the low production cost required by the method although this may be done by various other methods and equivalent or better effects can be achieved through the use of other techniques such as quenching.

The alloy so obtained is preferably mechanically wet-ground in water or in an aqueous solution, using, for example, an attritor. In this manner, localized oxidation that occurs on the surface of the alloy is reduced, as compared to dry-grinding, which makes it possible to apply succeeding treatments in a more uniform manner. The size distribution of the resulting particles of the hydrogen-absorption alloy is limited such that the following relationships hold: $d90/d10 \leq 8$ and $d90-d10 \leq 50$ μm; and $d90 \leq 60$ μm and/or $d50 \leq 25$ μm, where di (where i varies from 0 to 100) means a particle size at which cumulative size frequency with respect to the entire particles is i %. The hydrogen-absorption alloy particles having such size distribution can be obtained by any method, for example, grinding followed by sorting with a sieve. The size distribution can be measured by the laser measurement method. In this embodiment, the size distribution is measured by employing a laser diffraction size distribution measuring apparatus SALD-1000 (manufactured by Shimadzu Corporation), and employing a volume of the each particle as a particle size.

The hydrogen-absorption alloy particles so obtained are then subjected to treatment with an aqueous alkaline solution. The alkaline solution is preferably a solution of an alkaline metal hydroxide such as NaOH or KOH and preferably has a concentration in the range of 10 to 50% by weight. Preferably, the temperature of the solution is maintained at 60 to 140° C. during the treatment, and the alloy particles are immersed in the solution for 0.5 to 5 hours. If any of these parameters has a value smaller than the lower limit of the specified range, then the intended results of the alkaline treatment are not obtained. The treatment is preferably carried out while the alkaline solution is stirred.

Through this alkaline treatment, the alloy components that are readily soluble in the electrolytic solution are removed from the surface of the alloy. As a result, microscopic physical short circuits caused by electrochemical oxidation/reduction of the alloy components are prevented from occurring and the durability of the hydrogen-absorption alloy electrode in the electrolytic solution is improved.

Experiments conducted to verify the performance of the hydrogen-absorption alloy electrode of the present invention are described in the following.

Experiment 1

$MmNi_{4.1}Co_{0.4}Mn_{0.4}Al_{0.3}$ was used as a hydrogen-absorption alloy (Mm is a mixture of rare earth elements such as La, Ce, Pr and Nd (Mischmetal)). The alloy was mechanically ground using an attritor, and the resulting alloy particles were sorted to obtain hydrogen-absorption alloy particles of various sizes.

The values of d90/d10, d90−d10, d90, and d50 are shown in Table 1 below for each of different types of the hydrogen-absorption alloy particles used in respective Examples (Sample No. 1 through No. 6) and Comparative Examples (Sample No. 1 and No. 2) in Experiment 1.

Each of the different types of the alloy particles was treated in an aqueous solution of KOH having a specific gravity of 1.30 at 90° C. for 1 hour. The particles were then washed with water and dried. 0.15 parts by weight of carboxymethylcellulose, 0.3 parts by weight of carbon black, 0.7 parts by weight of styrene-butadiene rubber, and 1.0 parts by weight of yttrium oxide were prepared with respect to 100 parts by weight of the alkaline-treated alloy particles. Styrene-butadiene rubber, carbon and yttrium oxide were mixed with each other to form a mixture, which in turn was dispersed in an aqueous solution of carboxymethylcellulose. To the dispersion solution, the alkaline-treated alloy particles were added, and the mixture was kneaded to form a paste. The paste was coated onto a nickel-plated punched steel sheet and then was dried. The steel sheet was then rolled to a predetermined thickness and was cut to a predetermined size to serve as a negative electrode plate. A conventional nickel electrode, made by filling a foamed nickel substrate with a mixture of active materials containing nickel hydroxide particles as a principal component, was used to serve as a positive electrode plate.

An electrode plate group was constructed by alternately stacking 14 negative electrode plates and 13 positive electrode plates, with a non-woven fabric separator placed between each pair of the positive and negative electrode plates. The electrode plate group was placed in a plastic battery case, which was then filled with an aqueous solution of potassium hydroxide with a specific gravity of 1.30 to serve as an electrolytic solution and was sealed off with a seal plate having a vent to complete a nickel metal hydride rechargeable battery having a nominal capacity of 6.5 Ah.

10 batteries were prepared in the above-described manner for each of the different types of the alloy particles and were subjected to a cycle test. 1 cycle of the test consisted of charging the batteries for 1 hour at 1° C. (6.5 A) at a constant temperature of 25° C. and discharging the batteries at 1° C. until the battery voltage dropped to 1V. This cycle was repeated 300 times.

Subsequently, each battery was charged for 1 hour at 0.6° C. at a constant temperature of 25° C. and was left for 2 weeks in a thermostatic chamber at 45° C. The batteries were then discharged at 2 A at a constant temperature of 25° C. to a voltage of 1V, and the discharge capacity was determined for each battery (in % with respect to 6.5 Ah (=100%)).

The results are shown in Table 1.

TABLE 1

| Sample No. | | d90/d10 | d90-d10 | d90 | d50 | Remaining capacity (%) after 300 cycles |
|---|---|---|---|---|---|---|
| Ex. | 1 | 4.3 | 50 μm | 65 μm | 31 μm | 39.2-40.3 |
|  | 2 | 5.1 | 49 μm | 61 μm | 27 μm | 39.4-40.4 |
|  | 3 | 5.4 | 44 μm | 54 μm | 27 μm | 39.3-40.0 |
|  | 4 | 6.3 | 42 μm | 50 μm | 24 μm | 39.4-40.0 |
|  | 5 | 4.9 | 31 μm | 39 μm | 20 μm | 39.6-40.1 |
|  | 6 | 8.0 | 49 μm | 56 μm | 25 μm | 39.6-40.2 |
| Comp. Ex. | 1 | 12.0 | 55 μm | 60 μm | 26 μm | 37.1-40.6 |
|  | 2 | 13.5 | 50 μm | 54 μm | 23 μm | 36.5-40.3 |

As can be seen from the results shown in Table 1, the deviation in the capacity after 300 cycles were apparently smaller in Examples (Sample No. 1 through No. 6 restricted in size distribution) than in Comparative Examples (Sample No. 1 and No. 2). This indicates that the deviation in the self-discharge capacity resulting after the charging/discharging cycles was reduced in Examples. In addition, it has turned out that the deviation in self-discharge capacity was particularly small in Examples in which d90≦60 μm or d50≦25 μm (Sample No. 3 through 6). Since the event of self-discharge is caused by dissociation of hydrogen from the negative electrode that takes place as the metal corrodes or crumbles, the deviation in the self-discharge capacity resulting after the charging/discharging cycles is reduced by limiting the size distribution of the alloy particles to a relatively narrow range, as in the present invention, so that the metal corrodes or crumbles uniformly.

Experiment 2

In this experiment, the same hydrogen-absorption alloy as that used in Experiment 1 was used and hydrogen-absorption alloy electrodes were prepared in the same manner as in Experiment 1, except that the conditions for the alkaline treatment were changed. In Examples (Sample No. 7 through No. 9), the alloy particles were treated with NaOH solution under boiling conditions of 125° C. for 1 hour. The amount of each of the metals dissolved in the treatment solution was measured by ICP after the treatment. The ratio of the amount of each metal to that of the other metals in the alloy is shown in Table 2, while the ratio of the amount of each metal to that of the other metals dissolved in the solution is shown for each Example and Comparative Example in Table 3. The ratios in Tables 2 and 3 are each shown in weight basis. In Comparative Example (Sample No. 3), the alloy particles were subjected to the same alkaline treatment as in Experiment 1.

TABLE 2

| Co in alloy/Al in alloy | Co in alloy/Mn in alloy | Co in alloy/(Al + Mn) in alloy |
|---|---|---|
| 2.91 | 1.07 | 0.78 |

TABLE 3

|  | Sample No. | dissolved Co/ dissolved Al | dissolved Co/ dissolved Mn | dissolved Co/ dissolved (Al + Mn) |
|---|---|---|---|---|
| Ex. | 7 | 2.70 ○ | 0.90 ○ | 0.50 ○ |
|  | 8 | 3.05 X | 0.99 ○ | 0.77 ○ |
|  | 9 | 2.45 ○ | 1.11 X | 0.76 X |
| Comp. Ex. | 3 | 2.96 X | 1.25 X | 0.88 X |

Each sample of Examples and Comparative Example will now be described. For Sample No. 7, the ratio of the dissolved Co/Al (2.70) is smaller than the ratio of the alloy Co/Al (=2.91). This indicates that Al dissolved faster than Co and thus, the proportion of Co remaining on the treated surface with respect to the initial amount of Co was larger than the remaining proportion of Al with respect to the initial amount of Al. Also, the ratio of the dissolved Co/Mn (0.90) is smaller than the ratio of the alloy Co/Mn (1.07), indicating that the remaining proportion of Co was larger than that of Mn with respect to the initial amounts of the respective metals. Furthermore, the ratio of the dissolved Co/(Al+Mn) (0.50) is smaller than the alloy Co/(Al+Mn) (0.78), indicating that the remaining proportion of Co was larger than that of (Al+Mn) with respect to the initial amounts of the respective metals.

For Sample No. 8, the ratio of Co/Al indicates that the remaining proportion of Al was larger than that of Co with respect to the initial amounts of the respective metals, whereas the ratio of Co/Mn indicates that the remaining proportion of Co was larger than that of Mn. Also, the ratio of Co/(Al+Mn) indicates that the remaining proportion of Co was larger than that of (Al+Mn).

For Sample No. 9, the ratio of Co/Al indicates that the remaining proportion of Co was larger than that of Al with respect to the initial amounts of the respective metals, and the ratio of Co/Mn indicates that the remaining proportion of Mn was larger than that of Co. Also, the ratio of Co/(Al+Mn) indicates that the remaining proportion of (Al+Mn) was larger than that of Co.

For Sample No. 3 of Comparative Example, the ratio of Co/Al indicates that the remaining proportion of Al was larger than that of Co with respect to the initial amounts of the respective metals, and the ratio of Co/Mn indicates that the remaining proportion of Mn was larger than that of Co. Also, the ratio of Co/(Al+Mn) indicates that the remaining proportion of (Al+Mn) was larger than that of Co.

The circles in Table 3 each indicate that the proportion of Co remaining on the surface of the alloy with respect to the initial amount of Co was larger than the remaining proportion of Al, Mn or (Al+Mn) with respect to the initial amount of each metal. Otherwise, a cross is assigned.

Using these hydrogen-absorption alloy particles, electrodes and batteries using the electrodes were prepared in the same manner as in Experiment 1. The batteries were subjected to a charging/discharging cycle test. 1 cycle of the test consisted of charging at 4 A for 1.625 hour (100% of the battery capacity) at 25° C. and discharging at 4 A to a voltage of 1V. The internal resistance of each battery was measured every 5 cycles.

The internal resistance was measured by charging each battery at 4 A for 1 hour, followed by subjecting the battery to a series of 5-second pulsed charging/discharging processes at a rate of 5 A, 20 A, and 60 A at a constant temperature of 25° C. The voltage and the current measured at 5 seconds from the beginning of each of the 5-second charging/discharging processes were measured to obtain the internal resistance. FIG. 1 shows the change in the internal resistances measured every 5 cycles, assuming that the resistance of Sample No. 3 of comparative Example at 0 cycle to be 100.

As shown in FIG. 1, the batteries incorporating the hydrogen-absorption alloys of Examples of the present invention, each of which meets one of the above-described conditions, have each proven to exhibit a better initial activity than does the battery incorporating the hydrogen-absorption alloy of Comparative Example.

Experiment 3

In this experiment, the effects provided by different types of the hydrogen-absorption alloy particles, each having a different size distribution in combination with different surface amounts of Al, Mn, and (Al+Mn), were examined. For that purpose, 4 different types of the alloy, A through D, each having a different size distribution, were prepared as shown in Table 4 below.

TABLE 4

| Alloy | d90/d10 | d90–d10 | d90 | d50 |
|---|---|---|---|---|
| A | 5.3 | 47 μm | 63 μm | 26 μm |
| B | 5.8 | 43 μm | 54 μm | 28 μm |
| C | 6.1 | 44 μm | 58 μm | 21 μm |
| D | 9.5 | 60 μm | 65 μm | 29 μm |

The three types of the alloy particles, A, B and C, are each sized such that d90/d10≦8 and d90–d10≦50 μm both hold. Of these, the alloy A does not satisfy d90≦60 μm, nor does it satisfy d50≦25 μm; the alloy B does not satisfy d50≦25 μm only; and the alloy C satisfies both conditions. The alloy D meets none of the above conditions.

The alloy-particles were subjected to an alkaline treatment modified in the same manner as in Experiment 2 above: In Examples (Sample No. 10 through No. 21), the alloy particles were treated with NaOH solution under boiling conditions of 125° C. for 1 hour, whereas in Comparative Examples (Sample No. 4 through No. 7), the alloy particles were subjected to the same alkaline treatment as in Experiment 1. Using these hydrogen-absorption alloy particles, electrodes and batteries using the electrodes were prepared in the same manner as in Experiment 1. The batteries were measured for the remaining capacity after 300 cycles as in Experiment 1 and were subjected to a charging/discharging cycle test in the same manner as in Experiment 2, in which the internal resistance of the batteries was measured every 5 cycles.

Figure 2:
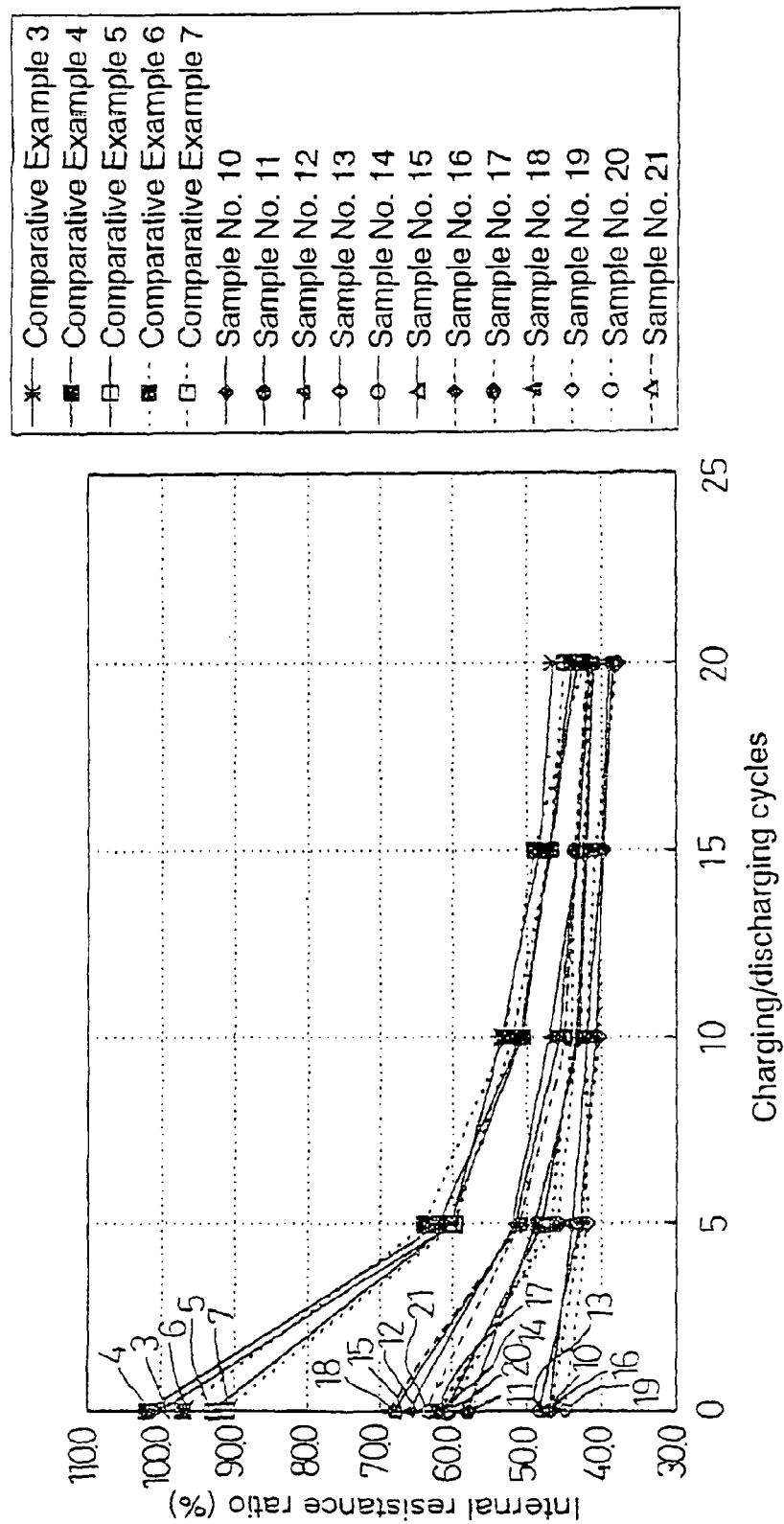
FIG. 2 is a graph showing the change in internal resistance ratio resulting from charging/discharging cycles for each of Examples of the hydrogen-absorption alloy electrode of the present invention and Comparative Examples.

The results were shown in Table 5 and FIG. 2. The vertical and horizontal axes in FIG. 2 represent the same variables as in FIG. 1.

TABLE 5

| | Sample No. | Alloy | Remaining capacity (%) after 300 cycles | dissolved Co/ dissolved Al | dissolved Co/ dissolved Mn | dissolved Co/ dissolved (Al + Mn) |
|---|---|---|---|---|---|---|
| Ex. | 10 | A | 39.3-40.3 | 2.85 | 0.95 | 0.71 |
| | 11 | | 39.2-40.3 | 3.06 | 0.96 | 0.73 |
| | 12 | | 39.2-39.8 | 2.87 | 1.07 | 0.78 |
| | 13 | B | 39.4-40.1 | 2.77 | 0.95 | 0.71 |
| | 14 | | 39.2-40.0 | 3.11 | 1.04 | 0.78 |
| | 15 | | 39.4-40.1 | 2.76 | 1.11 | 0.79 |
| | 16 | C | 39.2-39.8 | 2.85 | 0.92 | 0.70 |
| | 17 | | 39.2-39.8 | 3.30 | 0.95 | 0.73 |
| | 18 | | 39.4-40.0 | 2.83 | 1.10 | 0.79 |
| | 19 | D | 37.6-41.1 | 2.70 | 1.01 | 0.74 |
| | 20 | | 37.3-41.1 | 3.10 | 0.90 | 0.70 |
| | 21 | | 37.0-41.8 | 2.89 | 1.09 | 0.79 |
| Comp. Ex. | 4 | A | 38.8-40.0 | 3.01 | 1.21 | 0.86 |
| | 5 | B | 39.3-40.2 | 2.93 | 1.13 | 0.82 |
| | 6 | C | 39.4-40.0 | 2.97 | 1.15 | 0.83 |
| | 7 | D | 38.0-42.0 | 3.35 | 1.22 | 0.89 |

For Samples No. 4 through No. 7, which served as Comparative Examples and correspond to the respective types of the alloy, A through D, the ratios of Co/Ai, Co/Mn, and Co/(Al+Mn) dissolved in the treatment solution are larger than the respective ratios of Co/Al, Co/Mn, and Co/(Al+Mn) present in the respective alloys. This indicates that in each case Co dissolved in the treatment solution faster than did Al, Mn, or (Al+Mn) Accordingly, each of the different types of the alloy serving as Comparative Examples has a relatively large internal resistance during initial charging/discharging cycles as shown in FIG. 2.

For Examples, Samples No. 10 through No. 12 used the alloy A, Samples No. 13 through No. 15 used the alloy B, Samples No. 16 through No. 18 used the alloy C, and Samples No. 19 through No. 21 used the alloy D. For each of Samples No. 10, 13, 16, and 19, the remaining proportion of Co was larger than each of the remaining proportions of Al, Mn and (Al+Mn), as was in Sample 7 in Experiment 2. For each of Samples No. 11, 14, 17, and 20, the remaining proportion of Co was less than or equal to the remaining proportion of Al but was larger than each of the remaining proportions of Mn and (Al+Mn), as was in Sample No. 8 in Experiment 2. For each of Samples No. 12, 15, 18, and 21, the remaining proportion of Co was larger than that of Al but was less than or equal to each of the remaining proportions of Mn and (Al+Mn), as was in Sample 9 in Experiment 2.

In Table 5, each of Examples corresponding to Samples No. 19 through No. 21, each of which used the alloy D, exhibited a relatively large deviation in the remaining capacity after 300 cycles, as did each of Comparative Examples. In comparison, each of Examples using the respective alloys A, B and C exhibited a relatively small deviation, with the one using the alloy C showing a particularly small deviation.

In regard of the initial activation effects achieved through adjustment of the amount of Al, Mn and (Al+Mn) remaining on the surface of the alloy, the variation among the different types of the alloy was relatively small, and each of Examples using the alloy particles that had the remaining proportion of Co greater than that of Al, Mn and (Al+Mn) showed significantly improved initial activity.

According to the present invention, limited size distribution of the hydrogen-absorption alloy particles for use as electrodes has led to reduced deviation in the battery characteristics after charging/discharging cycles. Also, the activity of the alloy and thus the activity of the batteries during initial charging/recharging cycles are increased by increasing the remaining proportion of Co on the surface of the alloy particles.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A method of manufacturing a hydrogen-absorption alloy electrode which comprises particles of a hydrogen-absorption alloy that comprises a rare earth element, Ni, and Co, wherein the method comprises providing particles having a size distribution such that $d90/d10 \leqq 8$ and $d90-d10 \leqq 50$ μm, where di (where i varies from 0 to 100) means a particle size at which a cumulative size frequency with respect to the entire particles is 1%, and subjecting the particles to an alkaline treatment in a NaOH solution under a boiling condition for 0.5 hours or longer, and wherein the hydrogen-absorption alloy further comprises Al and the particles are subjected to the alkaline treatment such that on a surface of the particles (amount of Al on surface/amount of Al in alloy)<(amount of Co on surface/amount of Co in alloy).

2. A method of manufacturing a hydrogen-absorption alloy electrode which comprises particles of a hydrogen-absorption alloy that comprises a rare earth element, Ni, and Co, wherein the method comprises providing particles having a size distribution such that $d90/d10 \leqq 8$ and $d90-d10 \leqq 50$ μm, where di (where i varies from 0 to 100) means a particle size at which a cumulative size frequency with respect to the entire particles is 1%, and subjecting the particles to an alkaline treatment in a NaOH solution under a boiling condition for 0.5 hours or longer, and wherein the hydrogen-absorption alloy further comprises Mn and the particles are subjected to the alkaline treatment such that on a surface of the particles (amount of Mn on surface/amount of Mn in alloy)<(amount of Co on surface/amount of Co in alloy).

3. A method of manufacturing a hydrogen-absorption alloy electrode which comprises particles of a hydrogen-absorption alloy that comprises a rare earth element, Ni, and Co, wherein the method comprises providing particles having a size distribution such that $d90/d10 \leqq 8$ and $d90-d10 \leqq 50$ μm, where di (where i varies from 0 to 100) means a particle size at which a cumulative size frequency with respect to the entire particles is 1%, and subjecting the particles to an alkaline treatment in a NaOH solution under a boiling condition for 0.5 hours or longer, and wherein the hydrogen-absorption alloy further comprises Al and Mn and the particles are subjected to the alkaline treatment such that on a surface of the particles (amount of Al+Mn on surface/amount of Al+Mn in alloy)<(amount of Co on surface/amount of Co in alloy).

4. The method of claim 1, wherein the particles are subjected to the alkaline treatment until the particles corrode to a depth of about 0.4 μm.

5. The method of claim 2, wherein the particles are subjected to the alkaline treatment until the particles corrode to a depth of about 0.4 μm.

6. The method of claim 3, wherein the particles are subjected to the alkaline treatment until the particles corrode to a depth of about 0.4 μm.

* * * * *

UNITED STATES PATENT AND TRADEMARK OFFICE
CERTIFICATE OF CORRECTION

PATENT NO. : 7,943,255 B2
APPLICATION NO. : 11/546336
DATED : May 17, 2011
INVENTOR(S) : Kojiro Ito et al.

It is certified that error appears in the above-identified patent and that said Letters Patent is hereby corrected as shown below:

On the cover of the printed patent, at Item (73), Assignee should be "PANASONIC CORPORATION, Osaka (JP)" and "TOYOTA JIDOSHA KABUSHIKI KAISHA, Aichi (JP)", instead of "PANASONIC CORPORATION, Osaka (JP)".

Signed and Sealed this
Nineteenth Day of July, 2011

David J. Kappos
*Director of the United States Patent and Trademark Office*